(12) United States Patent
Cordry

(10) Patent No.: US 6,416,661 B1
(45) Date of Patent: Jul. 9, 2002

(54) UNIVERSAL WELL SCREEN FILTER

(76) Inventor: Kent E. Cordry, 308 Mountaire Pkwy., Clayton, CA (US) 94517

(*) Notice: Subject to any disclaimer, the term of this patent is extended or adjusted under 35 U.S.C. 154(b) by 0 days.

(21) Appl. No.: 09/413,686

(22) Filed: Oct. 7, 1999

Related U.S. Application Data
(60) Provisional application No. 60/103,337, filed on Oct. 7, 1998.

(51) Int. Cl.$^7$ .......................... E02B 1/00; B01D 29/15; E03B 3/18
(52) U.S. Cl. ................ 210/170; 210/457; 210/483; 166/228; 166/236; 166/264
(58) Field of Search ................ 210/35, 457, 483, 210/170; 405/128; 55/512, 515, 517, 510, 492; 166/236, 228, 264

(56) References Cited

U.S. PATENT DOCUMENTS

| | | | |
|---|---|---|---|
| 58,721 A | 10/1866 | Duck et al. | 175/314 |
| 58,769 A | 10/1866 | Bruen | 166/103 |
| 166,136 A | 7/1875 | Patterson | 175/314 |
| 1,211,415 A | 1/1917 | Cross | 166/160 |
| 1,473,644 A * | 11/1923 | Rodrigo, Sr. | 166/236 |
| 1,588,920 A * | 6/1926 | Trahan et al. | 166/236 |
| 2,374,227 A | 4/1945 | Metcalf | 166/264 |
| 2,376,366 A | 5/1945 | Lawlor et al. | 166/264 |
| 2,877,852 A * | 3/1959 | Beshara | 166/236 |
| 4,438,654 A | 3/1984 | Torstensson | 73/864.52 |
| 4,526,230 A | 7/1985 | Kojicic | 166/236 |
| 4,583,594 A | 4/1986 | Kojicic | 166/228 |
| 4,649,996 A | 3/1987 | Kojicic et al. | 166/228 |
| 4,669,554 A | 6/1987 | Cordry | 175/59 |
| 4,804,050 A | 2/1989 | Kerfoot | 175/20 |
| 5,046,568 A | 9/1991 | Cordry | 175/21 |
| 5,146,998 A | 9/1992 | Cordry et al. | 175/21 |
| 5,449,045 A | 9/1995 | Cordry | 175/20 |
| 5,570,747 A | 11/1996 | Cordry | 175/20 |
| 5,669,454 A | 9/1997 | Cordry | 175/20 |
| 5,855,242 A * | 1/1999 | Johnson | 166/236 |

OTHER PUBLICATIONS

B–A. Torstensson, Paper entitled "A New System for Ground Water Monitoring," *Groundwater Monitoring and Remediation*, Fall 1984, pp. 131–138.

"Direct Push Tools From GeoInsight," *The Small Diameter Well Catalog 2000*, GeoInsight, Clayton, California (6 pages).

Advertising Flyer—New Products from GeoInsight, GeoInsight, Clayton, California, 1997, (2 pages).

Catalog Sheet—Campbell Monoflex Installation Accessories, Campbell Manufacturing, Inc., Bechtelsville, Pennsylvania (need date).

* cited by examiner

*Primary Examiner*—Robert A. Hopkins
(74) *Attorney, Agent, or Firm*—Christie, Parker & Hale, LLP

(57) ABSTRACT

A universal well screen filter assembly for installation in a borehole formed in a fluid bearing formation to filter fluid passing therethrough. The screen filter includes an outer cylindrical perforated screen member and an inner cylindrical perforated screen member which is aligned concentrically with the outer screen member. The inner screen member has a smaller diameter than the outer screen member and positioned to define an annular filter space therebetween. This space is substantially filled with a filter medium which is designed to filter particulate materials from fluid passing through the medium. An upper end cap is secured to an upper end of each of the spaced apart screen members to seal the annular space therebetween and a lower end cap is secured to a lower end of each of the spaced apart screen members to also seal the annular space therebetween. A tubular member is aligned concentrically and extends through the screen filter. The tubular member is adapted for passage of fluid and includes perforations to allow fluid to pass through the screen filter and into the tubular member. The screen filter is also adapted for slidable removal and replacement over the tubular member.

17 Claims, 3 Drawing Sheets

UNIVERSAL WELL SCREEN FILTER

CROSS-REFERENCE TO RELATED APPLICATION

This application claims the benefit of Provisional Application No. 60/103,337, filed Oct. 7, 1998, the disclosure of which is incorporated fully herein by reference.

FIELD OF THE INVENTION

This invention relates generally to filter and screen devices for use with underground fluid and gas extraction, sparging and monitoring equipment and more particularly, to a universal well screen filter for use with well sampling, monitoring, extraction and sparging equipment.

BACKGROUND OF THE INVENTION

Numerous devices have been developed for extraction, monitoring, sparging, sampling and other related underground well operations. In particular, a number of these devices have been developed for groundwater sampling, extraction and monitoring and similar operations, such as those described in commonly owned U.S. Pat. Nos. 4,669,554; 5,046,568; 5,449,045; 5,570,747; and 5,669,454, each of which is incorporated herein by reference. These devices are commonly known as sampling devices and typically include a drive point at a lower end for penetrating the ground and a hollow tubular body for the passage of fluids to the ground surface.

More specifically, these sampling devices generally include a drive point having a lower portion specifically configured for ground penetration and an upper portion which is removably coupled to a tubular drive point holder or extension tube. An elongated annular drive rod or drive casing is coupled to an upper end of the tubular drive point holder to extend its length to the ground surface and to facilitate driving of the drive point into the ground. Typically, the drive rod consists of a number of hollow drive rod sections coupled together to form a drive rod string. An annular seal is seated between the tubular drive point holder and the removably coupled drive point to prevent the ingress of groundwater or soil during insertion of the sampling device into the ground.

An interior pipe or well casing extends coaxially through both the drive rod string and the drive point holder to couple with the drive point. This internal pipe includes a lower section at its bottom end which includes a series of perforations or other openings that allow the groundwater or other fluid to enter. The groundwater can then be extracted or otherwise accessed through the interior pipe for sampling, extracting or other operations. To prevent sanding in, silting in or other forms of clogging at the base of the well as well as filtering, the perforations at the lower section of the interior pipe are often finely spaced slits.

In a typical operation, a section of the elongated annular drive rod is coupled to the tubular point holder which is in turn removably coupled to a drive point. The upper end of the annular drive rod is pushed, driven or otherwise forced into the ground to form a borehole. Additional sections of annular drive rods may be sequentially connected together to form a pipe string and increase the depth of penetration. The sampling device eliminates the need for drilling, digging or other well operations as well as the associated need to remove or otherwise handle the displaced soil. These advantages are particularly useful when testing in contaminated soil.

Once the drive point reaches the desired location and depth, the annular drive rod, including the attached tubular point holder and any attached pipe string are withdrawn slightly. This slight retraction causes a portion of the sampling device and particularly, the tubular point holder, to slide upward with respect to the drive point which is frictionally restrained in the ground. This upward sliding motion opens a flow path between the drive point and the retracted tubular drive point holder and permits groundwater to enter the sampling device at the desired depth only. The groundwater is then accessed through the interior pipe to be tested, sampled or otherwise treated. The annular drive rod, including any attached drive rod string is then removed, leaving the drive point and interior pipe within the ground.

Because the annular space between the borehole and the interior pipe or well casing is typically quite small, pouring sand or other filter medium to provide filtration around the slotted interior pipe is difficult, time consuming and often impossible. Similarly, when the interior pipe is only provided at the lower portion of the borehole, using the drive rod as the fluid conduit, pouring sand from the surface would also be quite difficult if not impossible.

In an effort to overcome these problems and to enhance filtering, prepack well screens are commonly used. These devices replace the lower section of the interior pipe. Presently, prepack well screens use a slotted inner pipe which has a threaded end that threads directly to the remaining length of interior pipe or well casing. This is similar to the perforated interior pipe described above. However, the slotted inner pipe is housed within a larger diameter screen or mesh cylinder. The annular space between the outside of the interior screen and the interior of the outer screen is filled with a uniform sand which is large enough to be retained between the slotted inner pipe and surrounding outer screen. Caps are used to support the outer screen about the inner pipe and to retain the sand therebetween.

Currently, several manufacturers supply this general type of sampling device. Each manufacturer has their own style and configuration as well as providing differing sizes. These differing sampling devices, including those having different diameters, are used to create different diameter boreholes and to accommodate various quantities of groundwater as well as to allow usage with different diameter drive rods and interior pipes. As a result, each manufacturer produces their own interior pipe and accompanying well screen device. Thus, any user of a particular interior pipe or well casing must also carry a compatible prepack well screen.

These configurations of prepack well screens and techniques of operation have numerous disadvantages. In general, a users ability to purchase and supply interior pipes and prepack well screens is limited since both must now be matched for proper connection. This limits a purchaser's ability to obtain components from various manufacturers. In addition, the need to always match the connecting ends leads to increased logistics and costs. There is thus, a need for a universal well screen filter which is capable of use with most any manufacturer's interior pipe or well casing. There is also a need for such a universal well screen device which is simple to use and inexpensive to manufacture.

SUMMARY OF THE INVENTION

The present invention overcomes the aforementioned problems by providing a universal well screen filter jacket which is removably replaceable over the section of perforated interior pipe. This universal configuration provides a standardized screen filter which is useable for all applications using the specified interior pipe diameter regardless of the interior pipe's manufacture, style or interconnection means. In addition, the present well screen filter utilizes a pair of spaced apart screen cylinders to form a dual walled filter sleeve or jacket. The use of dual screen walls provides a much greater filter surface area to facilitate the flow of filtration in addition to allowing the use of a finer filter medium aid reducing turbidity.

The present invention is generally directed to a well screen filter assembly for installation in a borehole formed in fluid bearing formations to filter fluid passing therethrough. The filter assembly includes a double cylinder screen filter which is removably replaceable over a perforated tubular fluid carrying member such as the lower section of an interior pipe. The screen filter filters the fluid which then passes into the tubular member through its perforations. The fluid may then be moved out of the hole through the tubular member.

The well screen filter includes an outer cylindrical meshed screen member and an inner cylindrical meshed screen member which is aligned concentrically with the first screen member. The inner screen member has a smaller diameter than the outer screen member and is positioned to define an annular filter space therebetween. The annular filter space is substantially filled with a filter medium which is designed to filter particulate materials from fluid passing through the medium while also reducing turbidity. An upper end cap is secured to an upper end of each of the spaced apart screen members to seal the annular space therebetween and a lower end cap is secured to a lower end of each of the spaced apart screen members to also seal the annular space therebetween. Both end caps are further adopted to snugly seal between the inner screen member and the tubular fluid carrying member. The well screen filter is configured for replaceable removal and positioning along the tubular member.

In another aspect of the present invention, the well screen filter assembly includes a dual screen wall filter which slidably fits over an interior tubular member such as a section of interior pipe. The interior pipe is adapted for passage of fluid and includes at least one perforation which allows fluid to pass through the surrounding screen filter and into the interior pipe. The screen filter is configured such that it is slidably removable and replaceable over the interior pipe and particularly, over the perforated portion of the lower section of the interior pipe. At least one fastener is used to secure the well screen filter to the interior pipe.

This invention, together with the additional features and advantages thereof, which was only summarized in the foregoing passages, will become more apparent to those of skill in the art upon reading the description of the preferred embodiments, which follows in the specification, taken together with the following drawings.

DETAILED DESCRIPTION OF THE INVENTION

Figure 1:
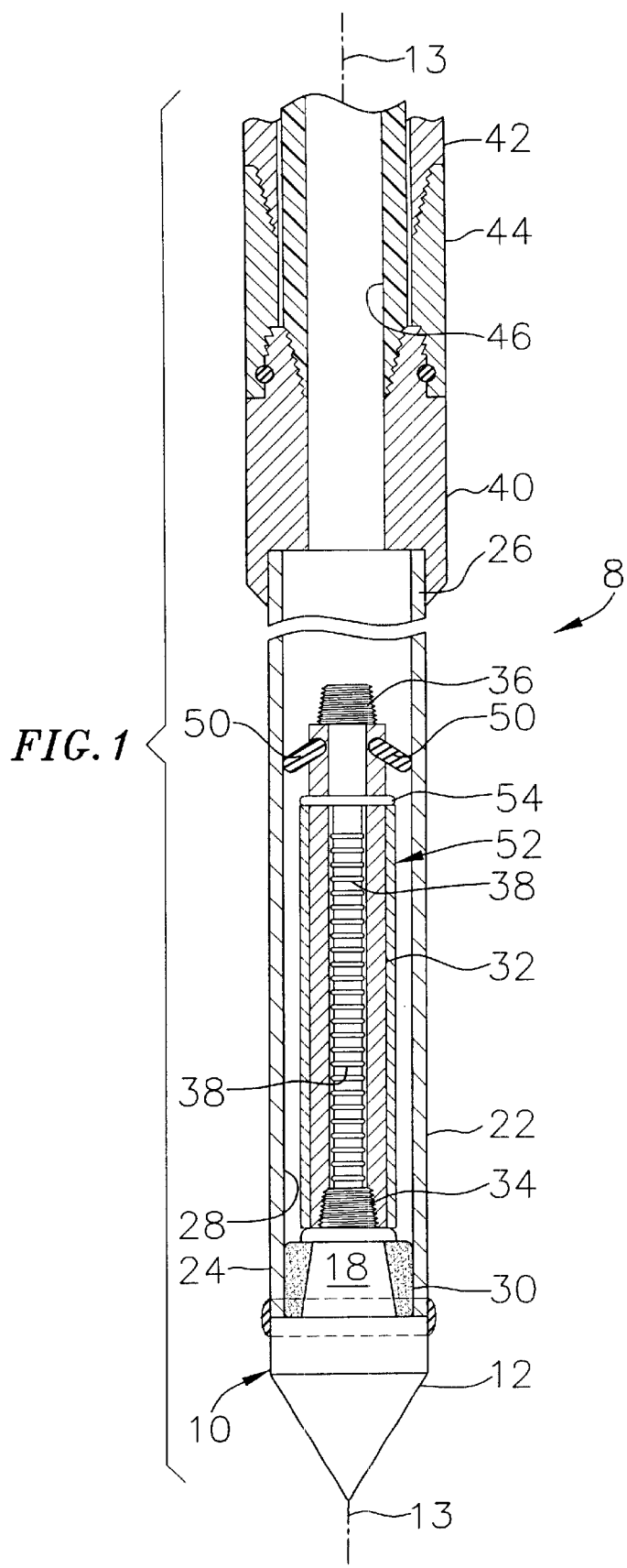
FIG. 1 is a schematic side elevational view of an embodiment of a sampling device constructed according to the principles of the present invention.
Figure 2:
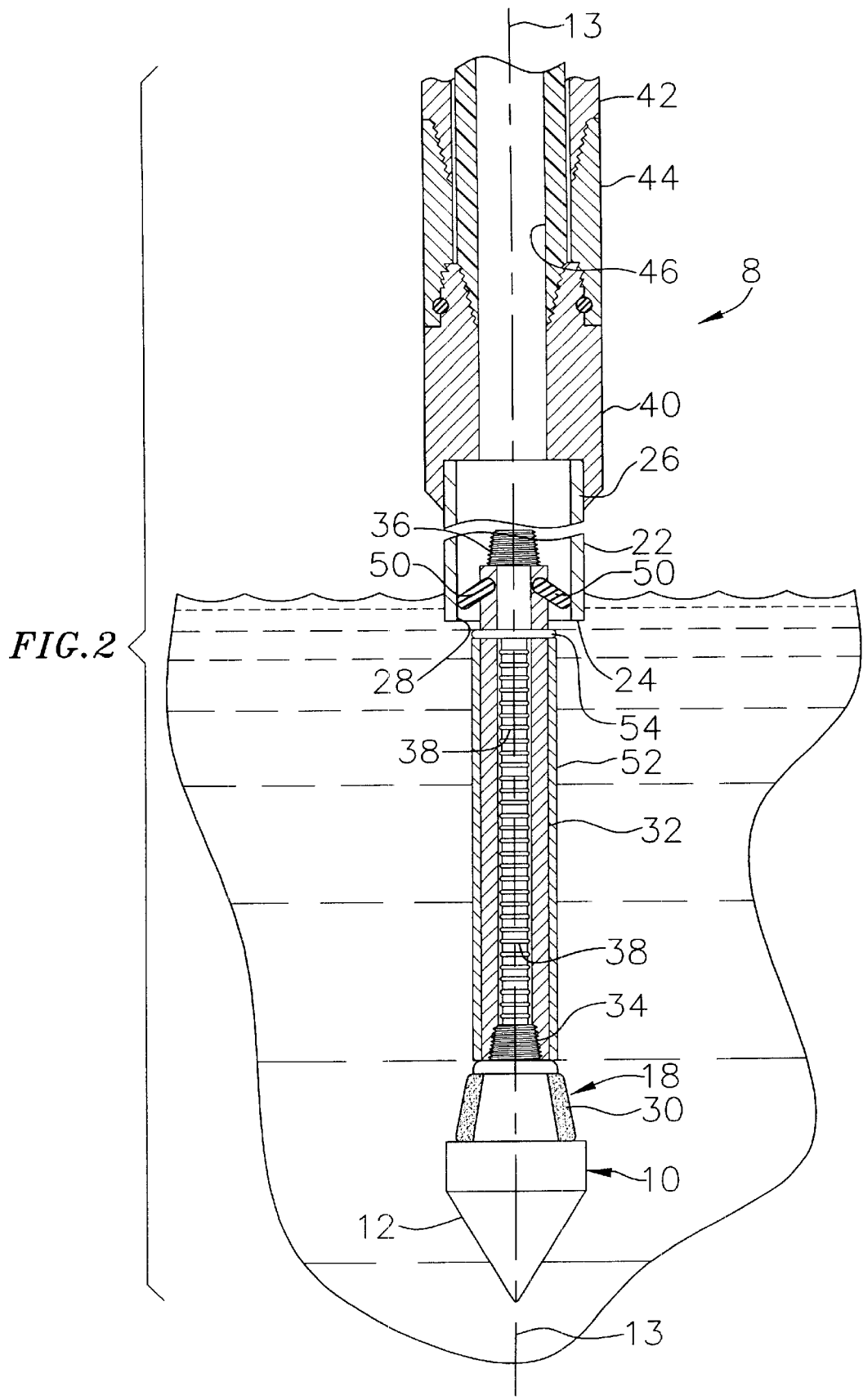
FIG. 2 is a schematic side elevation view of the sampling device of FIG. 1 shown driven and installed into the ground.

Referring to the drawings, wherein like reference numerals designate identical or corresponding parts throughout the several views and embodiments, an exemplary embodiment of a sampling device provided according to the principles of the present invention is illustrated in FIGS. 1 and 2 and identified by reference numeral 8. As shown in the figures, the sampling device 8 includes a removably attached drive point device 10 at its lowermost portion. The drive point device 10 includes a lower portion or drive cone 12 which is configured for penetrating the ground to form a borehole. In addition, the drive point device 10 includes a stub or connection end 18 which is configured for removable connection with an extension tube or tubular point holder 22 as will be described in greater detail below.

The tubular point holder 22 extends along a longitudinal axis 13 between a point holder bottom end 24 and a point holder top end 26. The point holder bottom end 24 surrounds at least a portion of the stub 18 when the drive point 10 is coupled to the point holder 22. More specifically, the point holder bottom end 24 includes an inner diameter 28 which surrounds and is removably coupled to at least a portion of the connection end 18 of the drive point 10.

An annular seal 30 or similar device frictionally couples the connection end 18 of the drive point 10 with the inner diameter 28 of the point holder bottom end 24. However, other types of seals and methods of coupling may also be used.

In the illustrated embodiment, a section of an interior perforated pipe 32 is disposed generally coaxially within the tubular point holder 22. The interior perforated pipe 32 extends along the longitudinal axis 13 between a pipe lower end 34 and a pipe upper end 36. The pipe lower end 34 is in contact with the drive point 10 and the pipe upper end 36 extends upwardly within the tubular point holder 22. Preferably, the interior pipe lower end 34 is threaded or otherwise fixably coupled to the connection end 18 of the drive point 10. In addition, the upper end 36 is threaded to allow connection with a section or sections of non-perforated interior pipe or well casing (not shown). A plurality of perforations 38 along the length of the interior pipe 32 allows fluid to pass from the borehole into the pipe. These perforations 38, which may range from a single slot to a plurality of narrow slits, are configured to allow the groundwater or other sampling fluid to freely enter or exit the pipe 32.

A universal well screen filter 52 surrounds the perforated portion of the section of perforated pipe 32 such that all fluid passing into or out of the interior pipe must pass therethrough. At least one fastener 54 is used to secure the well screen filter 52 to the perforated pipe 32. This effectively maintains the screen filter 52 axially over the perforations 38. The well screen filter 52 filters the groundwater to prevent the entry of dirt, mud, soil, rocks and other undesirable objects into the perforated pipe 32. In addition, the well screen filter 52 prevents the sanding in or silting in of the borehole adjacent the interior perforated pipe 32.

In the illustrated embodiment, a sealing body 40 is disposed circumferentially around the top end 26 of the tubular point holder 22. The sealing body 40 has a larger diameter than the point holder 22 and thus, seals tightly against the borehole. In this embodiment, fluid passing through the screen filter 52 and into the perforated pipe 32 is accessed directly through the borehole. Alternatively, additional lengths of inner pipe (not shown) may be axially coupled with the inner perforated pipe 32 to create a continuous access pipe to the surface.

An elongated annular drive rod 42 is removably coupled to the tubular point holder top end 26 and is configured for pushing, driving or otherwise forcing the drive point 10, coupled to the point holder 22, into the ground. The annular drive rod 42 may extend upwardly generally along the longitudinal axis above the ground. More than one annular drive rod 42 may be sequentially connected together as necessary, to extend the length of the drive rod and to facilitate forcing the drive point device 10 to the desired depth in the ground.

As also illustrated, a suitable releasable connecting means 44 is employed, such as reversing threads, releasing adapter or other type of connection to permit disconnection of the annular drive rod 42 from the tubular point holder 22. The presently preferred releasable connecting means 44 includes a pin and key way connection that allows the annular drive rod 42 to be released from the sealing body 40 by removal of the pin from a respective key way. Releasing the annular drive rod 42 isolates the tubular point holder 22 and the perforated pipe 32, along with the drive point device 10, which remain in the ground. The annular drive rods 42 may then be removed.

An inner drop pipe 46 is disposed coaxially within the annular drive rod 42 and is fluidly connected with the section of interior perforated pipe 32. The drop pipe 46, like the interior pipe 32, may be made from an inexpensive material such as a PVC pipe or other plastic pipe. However, hose, tubing or other materials may be used as is known to those of skill in the art. Alternatively, additional sections of non-perforated interior pipe may be directly coupled to the section of perforated interior pipe 32 to form a fluid passageway from the base of the well to the surface. When using a continuous length or string of interior pipe 32, the need for a drop pipe 46 is eliminated.

Prior to driving the drive point device 10 into the ground, the connection end 18 of the drive point 10 is coupled to the point holder bottom end 24. The sampling device 8 is then forced into the ground until the drive point 10 is positioned at the desired location and depth.

The drop pipe 46 or non-perforated interior pipe (not shown) is then passed through the annular drive rods 42 and fluidly connected to the upper end 36 of the perforated pipe 32 with the surrounding well screen filter 52. The annular drive rods 42 and coupled tubular point holder 22 may now be retracted from the drive point 10 which is frictionally fixed in the ground. Retraction of the tubular point holder 22 and annular drive rods 42, as best illustrated in FIG. 2, is further described in commonly owned U.S. Pat. No. 5,570,747, and herein expressly incorporated in its entirety by reference.

Raising the annular drive rods 42 with the sampling device 8 in place causes the tubular point holder 22 to be raised relative to the drive point 10 which is frictionally held in the ground. This raising separates the tubular point holder 22 from the connection end 18 and exposes the interior well screen filter 52 so as to allow fluid to enter. A first resilient seal 50 is preferably provided about the upper end 36 of the perforated pipe 32 or well screen filter 52 to seal against the inner wall of the tubular point holder 22 and prevent fluid from bypassing the screen filter. In one embodiment of the invention, first resilient seal 50 includes a cup seal, rod wiper or o-ring. The resilient seal 50 preferably allows slidable contact between the outer diameter of the upper end 36 of the perforated pipe 32 or well screen filter 52 and the inner diameter 28 of the tubular point holder 22.

Once the tubular point holder 22 is separated from the drive point 10, the annular drive rods 42 may be removed, leaving the inner drop pipe 46 sealably attached to the section of perforated pipe 32 or well screen device 52. Fluid-sampling devices may be inserted or a vacuum may be applied or pressurized fluid for sparging may be introduced, as desired.

Figure 3:
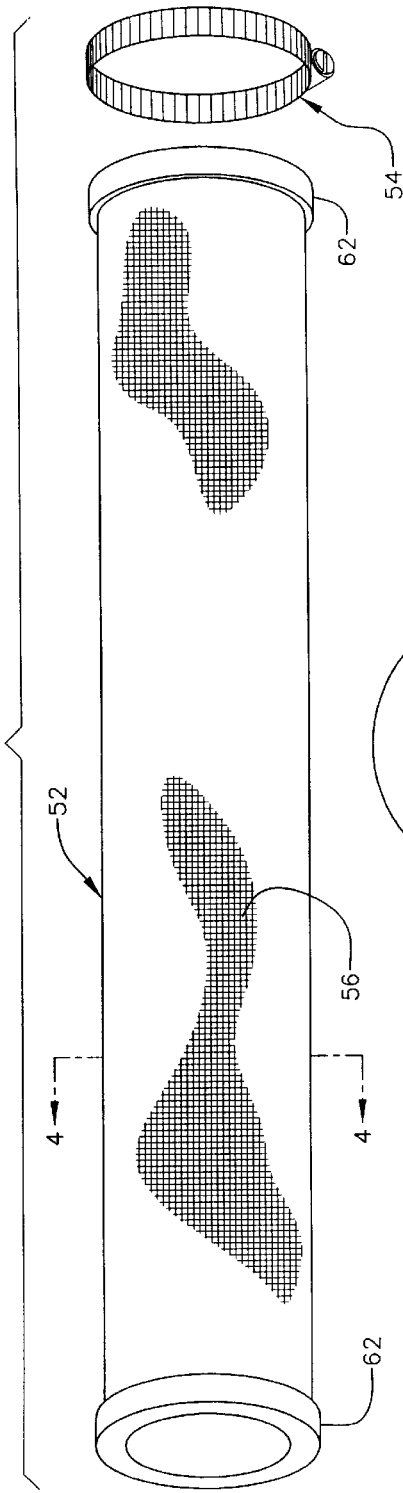
FIG. 3 is a perspective view of an embodiment of a universal well screen filter constructed according to the principles of the present invention.
Figure 4:
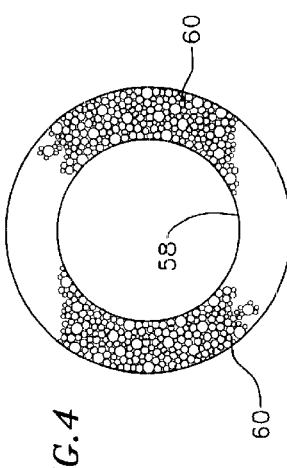
FIG. 4 is a sectional view of the universal well screen filter of FIG. 3, taken along lines 4—4.

Referring now to FIGS. 3 and 4, the exemplary embodiment of the universal well screen filter 52, will be described in greater detail. As shown, the universal well screen filter 52 includes an outer cylindrical perforated screen member 56 radially spaced apart from an inner perforated screen member 58. The annular space defined by the substantially coaxial outer and inner screen members 56 and 58 is substantially filled with a filter medium 60. End caps 62 secure the outer and inner screen members 56 and 58 together while retaining the filter medium therebetween.

More specifically, the universal well screen filter 52 comprises an inner screen member 58 which is preferably adapted to fit relatively tightly around a specific diameter of the interior perforated pipe 32. By relatively tightly, the inner screen member 58 should allow slidable movement along the length of the section of perforated interior pipe 32 but should not be able to fold or accordion. In one embodiment of the invention, the length of the universal well screen filter 52 is preferably 30 inches and has an inner diameter of 1.05 inches and an outer diameter of 1.40 inches. Because most manufacturers supply their sections of interior perforated pipe 32 with standardized diameters, the present universal well screen filter 52 will have an inner diameter adapter for snug fit about each of those standardized diameters. This allows users to advantageously use the present universal well screen filter 52 with most any manufacturer's interior pipe 32 regardless of the interconnections used. In addition, the present invention contemplates supplying the present universal well screen filter 52 with a prefitted interior perforated pipe 32 as will be described below.

As noted, the end caps 62 secure the outer and inner screen members 56 and 58 together while retaining the filter medium therebetween. Particularly, an end cap 62 is coupled to each distal end of the inner mesh screen member 58. These end caps 62 are preferably annular bushings which snugly fit about and seal against the outer diameter of the section of perforated pipe 32. The end caps 62 may be made from any material but are preferably made from a polymer. Additional end caps 62 may be distributed along the length of the screen members 56 and 58 to prevent their collapse and add strength to the screen filter 52.

The filter medium 60 is typically poured into the annular space between the outer and inner cylindrical screen members 56 and 58. This may be accomplished by inserting the inner screen member 58 coaxially within the outer screen member 56 and securing the two together through use of a lower end cap 62. The filter medium may then be poured into the annular space until the desired filter medium pack density is accomplished. Preferably, the filter medium 60 is uniformly filled within the annular space between the outer and inner cylindrical screen members 56 and 58.

The granular or diametrical size of the filter material 60 depends on many factors including, a sieve analysis of the fluid bearing formation and the screen mesh size. The filter medium 60 may include any variety of materials as is known to those of skill in the art, for example, sand, gravel or even polymer spheres. The filter medium 60 may also comprise a mixture of filter materials either uniformly mixed or alternatively, packed in segments to accomplish a tiered filtering.

The outer mesh screen member 56 and the inner mesh screen member 58 each preferably include a tubular section of a meshed screen material, such as a stainless steel screen. For example, each screen member may be made from a rectangular section of stainless steel screen material which is rolled and secured along its longitudinal sides to form a cylinder. Welding, adhesives, fasteners or any other method as known to those of skill in the art may be used to secure the screen longitudinal sides together.

Alternatively, the outer and inner screen members 56 and 58 may be made from different materials and have different mesh sizes and fluid transmitting capacity. Other materials might include, for example, different types of polymers screen, fiber glass, carbon steel or an alloy. In addition, the outer screen member 56 may be made of a stronger material than the inner screen member 58 because the outer screen is exposed to a harsher environment while the inner screen primarily supports only the filter medium 60.

Both the outer screen member 56 and the inner screen member 58 may be constructed using a common mesh screen material as described above. Preferably, the mesh size is configured to retain the filter medium 60 while also providing filtration. In one embodiment of the invention, the filter mesh is available in three sizes: a standard 20×40 mesh, a fine 40×70 mesh, and an ultra fine 100 mesh. However, the outer and inner screen members 56 and 58 may also have different mesh sizes. For example, the outer screen member 56 may have a slightly larger mesh size allowing the inner screen member 58 to further filter the fluid while enhancing flow through the filter 52 through increased transmitting capacity.

Thus, the universal well screen filter 52 provides a screen filter jacket which snugly fits over the perforated interior pipe 32 regardless of the manufacturer. Because the universal well screen filter 52 includes an outer mesh screen 56 and an inner mesh screen 58, the open surface area of the filter is doubled over a slotted interior pipe. This increase in surface area advantageously allows increased fluid flow rates as well as reducing turbidity.

Figure 5:
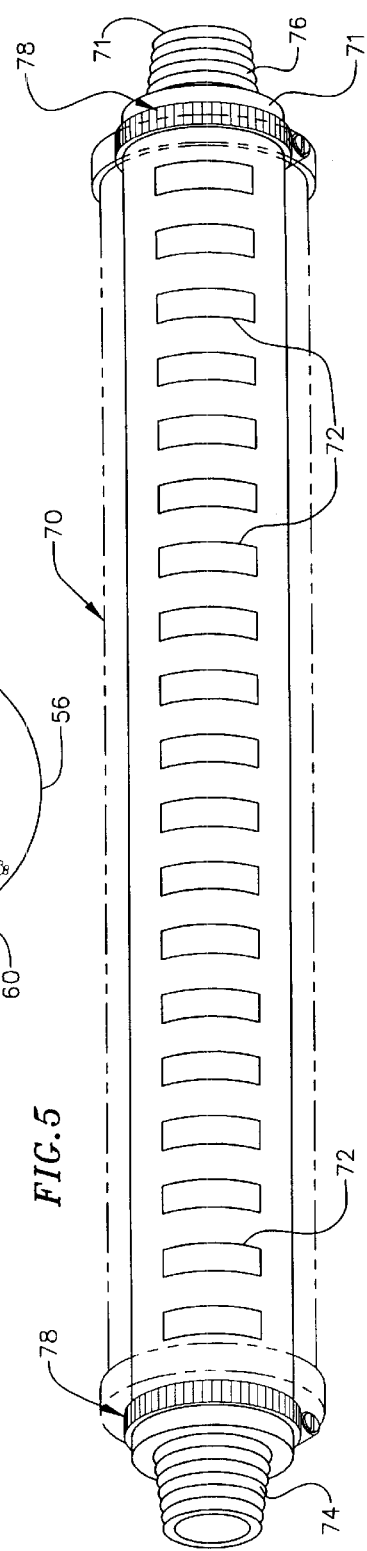
FIG. 5 is a perspective schematic view of an embodiment of a universal well screen filter and tubular point holder constructed according to the principles of the present invention.

Referring now to FIG. 5, an alternative embodiment of a universal well screen filter 70 will be described. In this embodiment, a universal well screen filter 70, as generally described above, is fitted with a section of interior perforated pipe 71, such as a section of plastic pipe. The perforated interior pipe 71 has at least one opening or perforation 72 to allow fluid to enter and exit the interior of the pipe. Preferably, the perforated interior pipe 71 has a plurality of spaced apart perforations 72 to ensure that the perforations do not increase flow resistance into or out of the interior pipe.

The perforated interior pipe 71 includes an upper fastening portion 74 at its upper end. The upper fastening portion 74 allows for interconnection with the remaining length of interior pipe (reference numeral 32 in FIGS. 1 and 2) or even additional lengths of perforated interior pipe 71. Preferably, the upper fastening portion 74 is a threaded portion of the pipe 71, such as a pipe thread, as is known to those of skill in the art. A seal may be provided to ensure sealing between the sections of pipe.

The perforated interior pipe 71 may also include a lower fastening portion 76 at its lower end. This lower fastening portion 76 may be adapted for interconnection with a drive point (reference numeral 10 in FIGS. 1 and 2). In the embodiment shown, the lower fastening portion is illustrated as a male thread. However, in an alternative embodiment, the lower fastening portion 76 may be configured as a section of internal threads within the pipe 71. This allows multiple sections of the universal well screen filter 70 to be axially interconnected.

To ensure that the screen filter 70 covers the perforations 72 and is not moved off of the perforations during installation and use, a fastener 78 is coupled about the section of perforated interior pipe 71. The fastener 78 prevents axial movement of the screen filter 70 relative to the perforated interior pipe 71. Preferably, a fastener 78 is coupled at either end of the screen filter 70 to prevent any axial movement relative to the interior pipe 71 and ensure all fluid entering the interior pipe passes therethrough. The fasteners 78 may be a stainless steel clip adapted to be secured about a diameter substantially equivalent to the interior pipe 71. Alternatively, the fasteners 78 may be bands, straps or any other device or method for securing the well screen filter 70 axially along the perforated pipe 71 as will be known to those of skill in the art.

It will be understood that various modifications can be made to the disclosed embodiments of the present invention without departing from the spirit and scope thereof. For example, various sizes of the universal well screen filter and particularly, various inner and outer diameters, are contemplated as well as various types of screen and filter materials and components. Also, various modifications may be made to the configuration of the parts and their interaction. Therefore, the above description should not be construed as limiting the invention, but merely as an exemplification of preferred embodiments thereof. Those of skill in the art will envision other modifications within the scope and spirit of the present invention as defined by the appended claims.

What is claimed is:

1. A screen filter assembly for installation in a hole formed in fluid bearing formations to filter fluid passing therethrough, the filter assembly comprising:

a double walled tubular screen filter including:

an outer cylindrical perforated screen member;

an inner cylindrical perforated screen member aligned concentrically with the outer screen member, said inner screen member having a smaller diameter than said outer screen member and positioned to define an annular filter space therebetween;

a filter medium substantially filling the annular filter space between the screen members for filtering particulate materials from fluid passing through the medium and wherein the filter medium comprises granules of material having a predetermined size;

an upper end cap secured to an upper end of each of the spaced apart screen members to seal the annular space therebetween;

a lower end cap secured to a lower end of each of the spaced apart screen members to seal the annular space therebetween;

a tubular member aligned concentrically and extending through the screen filter, the tubular member adapted for passage of fluid and having a perforation to allow fluid to pass through the screen filter and into the tubular member; and wherein the screen filter is adapted for slidable removal and replacement along the axial length of the tubular member.

2. The screen filter assembly as recited in claim 1, wherein the granules of material comprises a sand having a substantially uniform size.

3. The screen filter of claim 1, wherein the tubular member comprises a section of well screen for supporting the screen filter and providing a connection to a drop pipe, the well screen being concentric with the screen members and passing through the inner screen member.

4. The screen filter of claim 1, wherein the tubular member comprises a section of perforated pipe for supporting the screen filter and providing a connection to a drop pipe, the perforated pipe being concentric with the screen members and passing through the inner screen member.

5. The screen filter of claim 1, further comprising a fastener for attaching the screen filter to the perforated tubular member, said fastener comprises at least one of a band, a strap, a clip, and a pipe clamp.

6. The screen filter of claim 1, wherein the outer and inner screen members are made of different materials.

7. The screen filter of claim 1, wherein the outer and inner screen members have different mesh sizes.

8. The screen filer of claim 1, wherein the tubular portion includes a threaded portion along a distal end.

9. A screen filter assembly for installation in a hole formed in fluid bearing formations to filter fluid passing therethrough, the filter assembly comprising:
   a double walled tubular screen filter including:
      an outer cylindrical perforated screen member;
      an inner cylindrical perforated screen member aligned concentrically with the outer screen member, said inner screen member having a smaller diameter than said outer screen member and positioned to define an annular filter space therebetween;
      a filter medium substantially filling the annular filter space between the screen members for filtering particulate materials from fluid passing through the medium;
      an upper end cap secured to an upper end of each of the spaced apart screen members to seal the annular space therebetween;
      a lower end cap secured to a lower end of each of the spaced apart screen members to seal the annular space therebetween;
      a tubular member aligned concentrically and extending through the screen filter, the tubular member adapted for passage of fluid and having a perforation to allow fluid to pass through the screen filter and into the tubular member;
      wherein the screen filter is adapted for slidable removal and replacement along the axial length of the tubular member; and
      wherein at least one of the end caps is replaceable removable to facilitate the removal of the filter medium from between the spaced apart screen members.

10. The screen filter of claim 9, wherein the filter medium comprises granules of materials having substantially uniform sizes.

11. The screen fiter of claim 9, wherein the tubular portion includes a threaded portion along a distal end.

12. The screen filter of claim 9, wherein the inner screen member and outer screen member have different mesh sizes.

13. A sampling device adapted to be driven into the ground to form a borehole, the sampling device comprising:
   a drive point extending along a longitudinal axis between a drive cone and an upper stub, the drive cone adapted for penetrating the ground;
   a tubular point holder extending along the longitudinal axis between a point holder bottom end and a point holder top end, the point holder bottom end surrounding at least a portion of the stub;
   a perforated inner pipe disposed within the tubular point holder and extending along the longitudinal axis between a pipe lower end and a pipe upper end, the pipe lower end contacting an upper end of the stub;
   a tubular well screen filter disposed within the tubular point holder and coaxially surrounding the perforated portion of the inner pipe to filter fluid entering the inner pipe from the borehole, the well screen filter having an inner screen portion and an outer screen portion with a filter medium therebetween and being slidably removable from the inner pipe;
   a hollow annular drive rod extending between a drive rod lower end and a drive rod upper end, the drive rod lower end removably coupled to the tubular point holder top end and adapted for forcing the drive point and the coupled tubular point holder into the ground;
   a inner drop pipe disposed within the annular drive rod and fluidly connected with the perforated pipe; and
   a clip for securing the well screen filter to the perforated inner pipe.

14. The sampling device of claim 13, wherein the clip is adjustable.

15. The sampling device of claim 13, wherein the inner screen portion and the outer screen portion are made of different materials.

16. The sampling device of claim 13, wherein the inner screen portion and the outer screen portion have different mesh sizes.

17. The sampling device of claim 13, wherein the clip secures the well screen filter along the screen filter's upper portion and lower portion.

* * * * *

UNITED STATES PATENT AND TRADEMARK OFFICE
CERTIFICATE OF CORRECTION

PATENT NO.     : 6,416,661 B1
DATED          : July 9, 2002
INVENTOR(S)    : Kent E. Cordry It is certified that error appears in the above-identified patent and that said Letters Patent is hereby corrected as shown below:

<u>Column 8,</u>
Line 64, replace "comprises" with -- comprise --.

<u>Column 9,</u>
Line 47, replace "replaceable" with -- replaceably --.

Signed and Sealed this

Fourth Day of March, 2003

JAMES E. ROGAN
*Director of the United States Patent and Trademark Office*